United States Patent
Angelini et al.

(10) Patent No.: US 7,470,639 B2
(45) Date of Patent: Dec. 30, 2008

(54) PRODUCTION OF WETLAID-SPUNBOND LAMINATE MEMBRANE SUPPORT

(75) Inventors: Peter J. Angelini, Hendersonville, TN (US); Clement J. Haley, Mifflinburg, PA (US)

(73) Assignee: Fiberweb, Inc., Old Hickory, TN (US)

(*) Notice: Subject to any disclaimer, the term of this patent is extended or adjusted under 35 U.S.C. 154(b) by 542 days.

(21) Appl. No.: 11/369,243

(22) Filed: Mar. 7, 2006

(65) Prior Publication Data
US 2006/0151094 A1  Jul. 13, 2006

Related U.S. Application Data

(62) Division of application No. 10/615,231, filed on Jul. 7, 2003, now Pat. No. 7,051,883.

(51) Int. Cl.
*B32B 5/26* (2006.01)
*D04H 1/46* (2006.01)
*B01D 39/16* (2006.01)
B01D 29/00 (2006.01)
B01D 71/00 (2006.01)

(52) U.S. Cl. ............... 442/384; 442/361; 442/373; 442/382; 442/400; 442/401; 442/408; 210/490; 210/492; 210/500.21; 210/503; 162/123; 162/157.1; 162/157.3

(58) Field of Classification Search ............... None
See application file for complete search history.

(56) References Cited

U.S. PATENT DOCUMENTS

| | | | |
|---|---|---|---|
| 4,039,711 A | 8/1977 | Newman |
| 4,287,251 A | 9/1981 | King et al. |
| 4,728,394 A | 3/1988 | Shinjou et al. |
| 4,765,897 A | 8/1988 | Cadotte et al. |
| 4,795,559 A | 1/1989 | Shinjou et al. |
| 5,204,165 A | 4/1993 | Schortmann |
| 5,294,482 A | 3/1994 | Gessner |
| 5,399,422 A | 3/1995 | Dijkema et al. |
| 5,534,340 A | 7/1996 | Gupta et al. |
| 5,652,041 A | 7/1997 | Buerger et al. |
| 5,804,280 A | 9/1998 | Alex et al. |
| 5,851,355 A | 12/1998 | Goettmann |
| 5,942,452 A | 8/1999 | Daponte et al. |
| 6,048,809 A | 4/2000 | Brow et al. |
| 6,132,804 A | 10/2000 | Rice et al. |
| 6,156,680 A | 12/2000 | Goettmann et al. |
| 6,207,602 B1 | 3/2001 | Gessner et al. |
| 6,334,881 B1 | 1/2002 | Giannetta et al. |

(Continued)

FOREIGN PATENT DOCUMENTS

EP  0 960 645 A  12/1999

*Primary Examiner*—Krishnan S Menon
(74) *Attorney, Agent, or Firm*—Alston & Bird LLP

(57) ABSTRACT

Nonwoven fabric laminates suitable for use as semipermeable membrane supports are produced by forming a spunbond nonwoven fabric first layer of continuous thermoplastic polymer filaments; forming a wet-laid nonwoven fabric second layer of discrete length thermoplastic polymer fibers; and bonding the first and second layers in opposing face-to-face relationship to form a composite support, where the first and second layers define first and second outer surfaces of the composite support. The resulting semipermeable membrane supports provide an advantageous balance of properties, including smoothness, porosity, interlaminar adhesion, and flux properties.

10 Claims, 3 Drawing Sheets

U.S. PATENT DOCUMENTS

2002/0030009 A1  3/2002  Lin
2004/0248492 A1* 12/2004  Baker, Jr. .................... 442/381
2005/0215156 A1  9/2005  Ferencz et al.

* cited by examiner

PRODUCTION OF WETLAID-SPUNBOND LAMINATE MEMBRANE SUPPORT

CROSS-REFERENCE TO RELATED APPLICATIONS

This application is a divisional of U.S. application Ser. No. 10/615,231, filed Jul. 7, 2003, now U.S. Pat. No. 7,051,883 which is hereby incorporated herein in its entirety by reference.

FIELD OF THE INVENTION

The present invention is directed to nonwoven fabrics suitable for use as filtration support media. The present invention is more specifically directed to the production of nonwoven laminate fabrics suitable for use as precise filtration support media.

BACKGROUND OF THE INVENTION

Precise filtration processes, such as reverse osmosis, nano-filtration, ultra-filtration and micro-filtration, are used within a wide range of applications, including seawater desalination, fruit juice production and industrial wastewater treatment, among others. Synthetic filtration membranes, commonly referred to as semipermeable membranes, are typically used in conjunction with precise filtration processes. Semipermeable membranes provide selective mass transport, generally allowing the molecules of the solvent, but not the solute, to pass through their thickness. Semipermeable membranes are generally a thin layer of polymer, such as a layer of cast film. Synthetic filtration membranes may be formed from a number of polymers, including cellulose acetate, polyamide, polysulfone, polyvinylidene fluoride polymers and the like.

The process conditions encountered during filtration can be fairly rigorous. For example, elevated pressures of up to about 1200 psi may be employed to separate salt from seawater using reverse osmosis. Unfortunately, semipermeable membranes are typically relatively fragile. Laminate filter constructions incorporating a supporting substrate along with the semipermeable membrane are known to improve the durability of filtration media. Exemplary supporting substrates include a variety of porous materials, including sintered materials and nonwoven fabrics.

Laminate filter constructions were traditionally formed by casting the semipermeable membrane directly onto the supporting substrate. More recently, composite membranes, often referred to as Thin Film Composites ("TFC") have been developed. Composite membranes include a porous polymer layer, such as a porous polymer film, in addition to the semipermeable membrane. The porous polymer layer is typically located between the semipermeable membrane and the supporting substrate. The intermediate porous polymer layer allows much thinner semipermeable layers to be used, yielding higher flux rates.

During filtration, the ingressing liquid stream is typically transported through the semipermeable or composite membrane initially, exiting through the supporting substrate. Consequently, the supporting substrate must provide strength properties while having a minimal effect on the semipermeable or composite membrane's transport properties, e.g. permeability or flux.

Suitable supporting substrates, e.g., suitable nonwoven fabrics, exhibit a number of other advantageous properties, as well. For example, the supporting substrate should exhibit acceptable adhesion to the intermediate porous polymer layer or semipermeable membrane, to avoid delamination during filtration. Suitable adhesion may be achieved by allowing the intermediate porous polymer layer or semipermeable membrane to penetrate down into the surface of the supporting substrate. However, the penetration of the supporting substrate by the intermediate porous polymer layer or semipermeable membrane represents a delicate balance. Inadequate penetration yields unacceptable adhesion within the filter media. Over penetration of the supporting substrate, e.g., penetration by the intermediate porous polymer layer or semipermeable membrane to the surface opposing the cast surface, results in uneven filtration properties (e.g. reduced flux) and/or damage of the semipermeable membrane due to the partial excessive pressurization during filtration.

In addition to the properties described above, supporting substrates should further advantageously provide a suitably smooth surface on which to apply the intermediate porous polymer layer or semipermeable membrane. Surface imperfections, particularly surface projections, create pinholes within the intermediate porous polymer layer and/or the semipermeable membrane, detrimentally affecting filter performance.

Supporting substrates made from nonwoven wet-laid fibers have been found to provide an advantageously smooth surface and acceptable affinity to semipermeable membranes. Exemplary wet-laid nonwoven webs intended for use as semi-permeable membrane supports are described in U.S. Pat. No. 5,851,355 to Goettmann, hereby incorporated by reference. Supporting substrates formed from nonwoven wet-laid fiber webs have been commercially available under the product name MEMBACK® nonwovens, from BBA.

Composite support constructions may be used to improve the economics of semipermeable filtration media, especially filtration supports incorporating wet-laid nonwoven webs. For example, U.S. Pat. Nos. 4,728,394 and 4,795,559 describe membrane supports that include a carded fiber layer bonded to a wet-laid web. However, although porous membranes incorporating carded webs provide a number of beneficial properties, such laminates can suffer from an unacceptable level of pinholes within the semipermeable or composite membrane. Carded webs are further a relatively expensive substrate.

Consequently, a need remains for composite supports incorporating wet-laid fiber webs that provide improved surface properties. There further remains a need for composite supports incorporating wet-laid webs that can be produced more economically.

BRIEF SUMMARY OF THE INVENTION

The present invention provides composite supports for a semipermeable membrane exhibiting improved filter performance due to their advantageous surface properties. The composite supports are produced by a method including the steps of forming a spunbond nonwoven fabric first layer of continuous thermoplastic polymer filaments; forming a wet-laid nonwoven fabric second layer of discrete length thermoplastic polymer fibers; and bonding the first and second layers in opposing face-to-face relationship to form a composite support, wherein the first and second layers define first and second outer surfaces of the composite support.

The composite supports of the present invention include a wet-laid fiber web along with a spunbond fabric. Surprisingly, composite supports formed from wet laid and spunbond layers have been found to produce fewer surface disparities within the resulting filtration media.

The composite supports of the invention generally include a first layer of spunbond nonwoven fabric formed of continuous thermoplastic polymer filaments defining a first outer surface superposed with a second layer of wet-laid nonwoven fabric formed of discrete length thermoplastic polymer fibers defining a second outer surface. In preferred embodiments, the composite supports further include a thermoplastic polymer binder bonding the first and second layers to one another. In such embodiments, the thermoplastic polymer binder is in fibrous form. In further aspects, the thermoplastic polymer binder is adhered to the filaments of the first layer and to the fibers of the second layer.

The continuous thermoplastic polymer filaments and discrete length thermoplastic polymer fibers may each independently be formed from a number of resins, including polyester and polyamide, and copolymers and mixtures thereof. In preferred embodiments of the invention, the continuous filaments of the first layer and the discrete length fibers of the second layer are formed of the same thermoplastic polymer.

For example, the continuous thermoplastic polymer filaments and discrete length thermoplastic polymer fibers may both be formed from polyester polymer. In further aspects, the thermoplastic polymer binder comprises a polyester copolymer having a lower melting temperature than the polyester polymer used to form the filaments and discrete length fibers. The thermoplastic polymer binder may further be formed from a mixture of higher melting and lower melting polyester copolymers.

The discrete length fibers within the wet-laid nonwoven fabric typically have a length of from about 2.5 to 40 mm and are from about 0.2 to 3.0 denier per filament (dpf). The filaments of the spunbond layer generally are from about 1 to 10 denier per filament. The spunbond nonwoven generally has a basis weight of about 10 to 35 gsm and the wet-laid nonwoven fabric typically has a basis weight of about 30 to 70 gsm, with the resulting composite support having an overall basis weight of up to 80 gsm.

Filtration devices may be formed in accordance with the invention by adhering either a composite membrane or a semipermeable membrane to the second outer surface the composite support, i.e. the outer surface of the wet-laid layer. Exemplary materials from which to form the semipermeable membrane include cellulose acetate ("CA"), cellulose triacetate, CA-cellulose triacetate blends, gelatin, polyamine, polyimide, poly(ether imides), aromatic polyamide, polybenzimidazole, polybenzimidazolone, polyacrylonitrile ("PAN"), PAN-poly(vinyl chloride) copolymer, polysulfone, polyethersulfone, poly(dimethylphenylene oxide), poly(vinylidene fluoride), polyelectrolyte complexes, polyolefins, poly(methyl methacrylate) and copolymers thereof.

BRIEF DESCRIPTION OF THE DRAWINGS

The foregoing and other objects, features, and advantages of the present invention will be made apparent from the following detailed description of the invention and from the drawings, in which.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
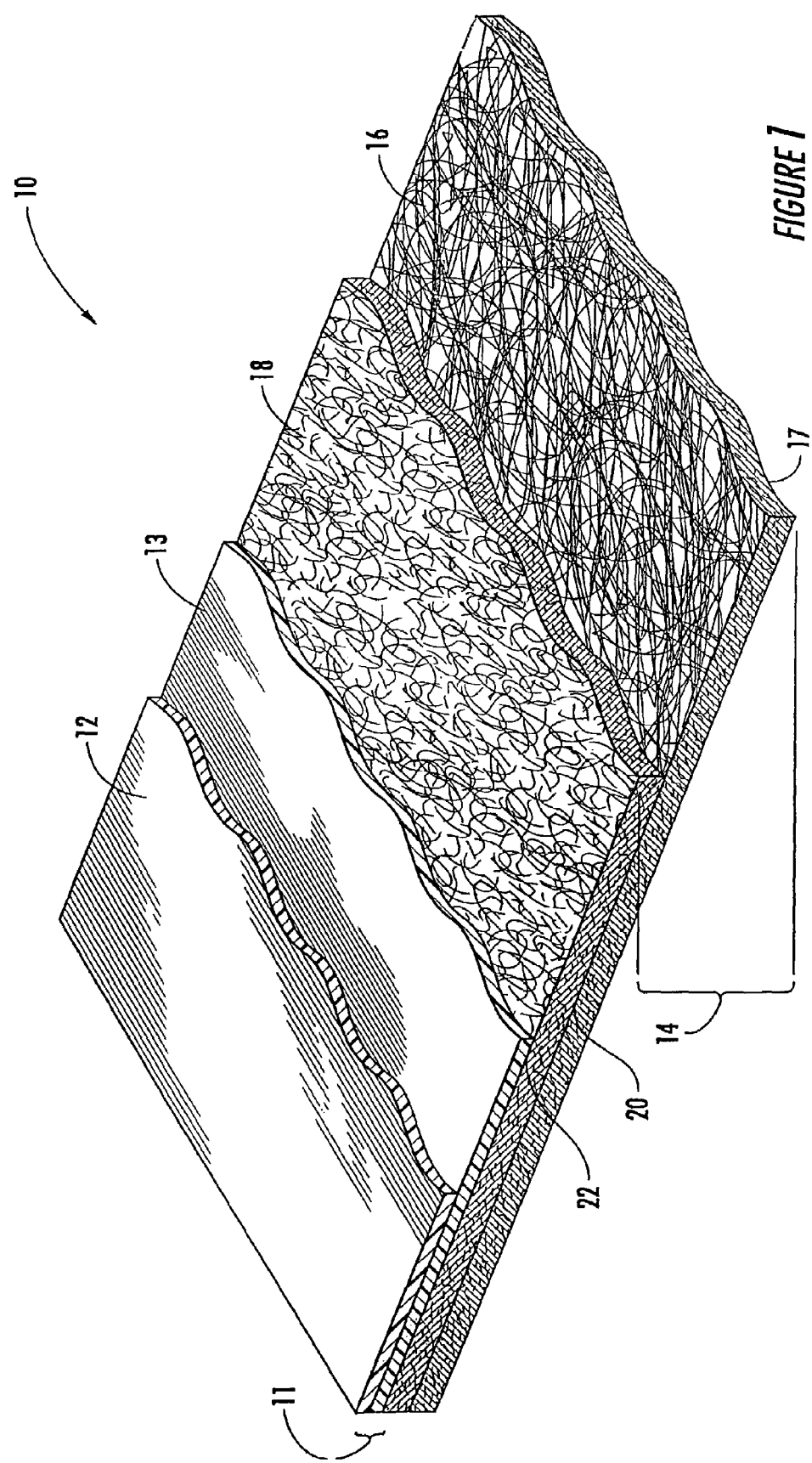
FIG. 1 is a schematic illustration of an enlarged cross-sectional view of exemplary filtration media formed in accordance with the invention.

A cross-sectional view of exemplary filtration media in accordance with the present invention is provided in FIG. 1. The filtration media 10 generally includes a composite membrane 11 adhered to a composite support 14. The composite membrane 11 generally includes a semipermeable membrane 12 and intermediate porous polymer layer 13. In alternative embodiments of the invention, the semipermeable membrane 12 may be used without the intermediate porous polymer layer 13, i.e. the intermediate porous polymer layer may be omitted from the filtration media 10. The composite support 14 includes (a) a first layer 16 formed of spunbond fabric defining a first outer surface 17 and (b) a second layer 18 formed of wet-laid fabric defining a second outer surface 22, i.e., the casting surface.

Although the filtration media, composite membranes and composite supports of the invention are referred to as containing "layers," this term is merely used to facilitate discussion concerning the differing compositions and/or constructions which may be present in various regions within the filtration media, composite membrane or composite support thickness. The filtration media, composite membranes and composite supports of the present invention, although referred to as being formed from such "layers," nevertheless provide unitary structures exhibiting cohesive properties throughout their thickness. Further, each "layer" is typically in direct liquid communication with its adjacent layer(s).

The spunbond fabric which forms the first layer 16 includes a plurality of continuous thermoplastic polymer filaments. More particularly, the spunbond fabric typically includes from about 80 to 100% weight percent continuous thermoplastic polymer filaments. As used herein, the terms "filament" and "continuous filament" are used in a generic sense to refer to fibrous materials of indefinite or extreme length, such as a length of several feet or greater. The denier per filament ("dpf") of the continuous filaments within the first layer 16 typically ranges from about 1 to 10 dpf, such as from about 4 to 6 dpf. In certain preferred embodiments, the spunbond filaments within the first layer 16 have a fineness of about 4 dpf, particularly 4 dpf fibers with a trilobal cross sectional shape. In alternative embodiments, the spunbond filaments may have a mixture of deniers.

The continuous filaments within the spunbond first layer 16 may be formed from any fiber forming thermoplastic polymer providing acceptable mechanical properties and chemical resistance. For example, the continuous filaments may be formed from polyester homopolymers and/or copolymers, or from polyamide homopolymers and/or copolymers or mixtures thereof. An exemplary polyester is polyethylene terephthalate. Exemplary polyamides include nylon 6 and nylon 6,6. In preferred embodiments of the invention, the continuous filaments within the first layer 16 are formed from polyethylene terephthalate.

The first layer 16 may be formed from spunbond continuous filaments of various cross sections known in the art of fiber formation, including trilobal, quadlobal, pentalobal, circular, elliptical and dumbbell-shaped. Either a single cross-section or a mixture of filaments of differing cross section may be included within the first layer 16. In preferred embodiments of the invention, the first layer 16 is formed from spunbond filaments having a trilobal cross section.

Applicants have found that spunbond layers possessing fairly uniform structures provide an unexpectedly smooth casting surface 22. Surprisingly, the smoothness of the interfacial surface 20 of the spunbond layer 16 translates into a superior casting surface 22 on the opposing side of the wet-laid second layer 18.

The first layer 16 further provides beneficial transport properties, e.g. porosity-permeability values. Exemplary porosity-permeability values for the first layer 16 ranges from about 800 to 1550 before calendering, such as porosity-permeability values ranging from about 1400 to 1550 (Textest Air Permeability). Porosity-permeability is generally related to density, such as apparent density, with higher density materials typically exhibiting lower porosity-permeability values. Exemplary apparent densities for the first layer 16 prior to calendering generally range from about 0.100 g/cc to 0.250 g/cc, such as apparent densities ranging from about 0.100 g/cc to 0.150 g/cc. The advantageous porosity-permeability values of the invention are unexpected in light of the density of the first layer 16. Although not wishing to be bound by theory, Applicants believe that such beneficial porosity-permeability values may be due the more open fiber structures provided by the continuous thermoplastic filaments in comparison to other nonwovens of comparable density.

To provide adequate interlaminar strength within the first layer 16, the continuous filaments within the spunbond first layer 16 are bonded to each other at points of contact. Although the continuous filaments within the spunbond first layer 16 are bonded, the nonwoven structure remains sufficiently open to provide beneficial flux properties, as indicated by the throughputs described above. However, although bonded at a level to insure adequate flux, the first layer 16 is nevertheless considered to be substantially fully bonded in that the spunbond filaments are bonded together at a plurality of crossover points. The bonding within the first layer 16 can be accomplished by any known means, such as by the melting of thermoplastic binder filaments, thermoplastic resin bonding, etc. In preferred embodiments, the first layer 16 is bonded using binder filaments. The binder filaments may be included within the first layer 16 in any amount effective to induce an adequate level of bonding. The binder filaments are typically present in the first layer 16 in an amount ranging from about 2 to 20 weight percent, such as an amount of about 10 weight percent. In alternative aspects of the invention, the spunbond filaments within the first layer 16 may be multiconstituent fibers that include a thermoplastic binder polymer as a component. For example, in such alternative embodiments the spunbond filaments may have a sheath/core configuration in which the sheath is formed from a binder polymer.

The binder filaments within the first layer 16 are generally formed from any polymer exhibiting a melting or softening temperature at least about 10° C. lower than the continuous filaments. The binder filaments may all be formed from the same polymer or may include a mixture of higher and lower melting binder filaments. For example, the binder filaments may include a mixture of filaments, a first portion of which have a lower melting temperature, such as about 225° F., and a second portion of which have a higher melting temperature, such as about 375° F. Exemplary binder filaments may be formed from one or more lower melting polymers or copolymers, such as polyester copolymers. In one embodiment of the invention, the spunbond layer is produced by extruding polyester homopolymer matrix filaments (polyethylene terephthalate) interspersed with binder filaments formed from a lower melting polyester copolymer, particularly polyethylene isophthalate.

The binder filaments within the first layer 16 may have any cross-section known in the art. In preferred embodiments, the binder filaments within the first layer 16 have a trilobal cross-section. The binder filaments within the first layer 16 may further have any denier or mixture of deniers known in the art for binding spunbond fabrics.

The first layer 16 is typically characterized by a basis weight ranging from about 10 to 35 gsm, such as 12 to 25 gsm. Suitable spunbond fabrics for use as the first layer 16 are commercially available, such as REEMAY Style 2004 spunbond, from Reemay, Inc. of Old Hickory, Tenn.

In the embodiment illustrated in FIG. 1, the composite support 14 includes a single spunbond first layer 16. In alternative embodiments, the composite support 10 can include more than a single spunbond layer. For example, the composite support 10 may include two contiguous spunbond layers. For embodiments including at least two spunbond layers, the fibers and materials comprising the respective spunbond layers may be the same or may differ. For example, the spunbond layers may differ in composition, denier, basis weight or fiber cross-section.

The second layer 18 is a wet-laid nonwoven fabric formed from a plurality of discrete length thermoplastic polymer fibers. More particularly, the wet-laid nonwoven fabric typically includes discrete length thermoplastic polymer fibers in amounts ranging from about 80 to 100 weight percent. As used herein the term "discrete length fibers" is used in a generic sense to describe fibrous materials which are not continuous in nature. Exemplary non-continuous fibers include staple fibers, wet-laid fibers and melt-blown fibers. Exemplary average lengths for the discrete length thermoplastic polymer fibers within the second layer 18 generally range from about 2.5 to 40 mm, preferably from about 5 to 13 mm. In preferred embodiments, substantially all of the discrete length fibers have approximately the same length, such as a length ranging from about 5 mm to 13 mm. In alternative aspects of the invention, a mixture of discrete fiber lengths may be employed.

One important feature of the wet-laid second layer 18 is its permeability-porosity. More particularly, if the permeability-porosity of the second layer 18 is too low, the semi-permeable membrane 12 will not bond to the composite support 14. Consequently, the permeability-porosity of the second layer 18 typically ranges from about 5 to 30 cfm (Textest Air Permeability after calendering). Along with fiber length (described above), the permeability-porosity within the second layer 18 is influenced by the fiber stiffness, which is in turn reflected by the fiber denier. Accordingly, the denier per filament ("dpf") of the discrete length fibers within the second layer 18 typically ranges from about 0.2 to 3.0 dpf, such as from about 0.43 to 1.5 dpf. In certain embodiments, the discrete length fibers all have approximately the same denier. In alternative embodiments, discrete length fibers having a mixture of deniers may be employed within the second layer 18.

The discrete length fibers within the second layer 18 may be formed from any fiber forming thermoplastic polymer providing acceptable mechanical properties and chemical resistance. For example, the discrete length fibers may be formed from homopolymers of polyester or polyamide, or mixtures or copolymers thereof. An exemplary polyester from which the discrete length fiber may be formed is polyethylene terephthalate. Exemplary polyamides include nylon 6 and nylon 6,6. In preferred aspects of the invention, the discrete length fiber is formed from polyethylene terephthalate.

The discrete length fibers within the second layer 18 may have any cross-section known in the art of fiber formation. In preferred embodiments, the discrete length fibers have a circular cross-section. In alternative embodiments, the discrete length fibers may have a cross-section imparting greater stiffness. Exemplary stiff fiber cross sections include any non-circular fibers defining four or more lobes, i.e., quadralobal (cross-shaped), pentalobal and the like, having any suitable modification ratio or dimensional relationship. The second layer 18 may be formed from discrete length fibers having a single cross-sectional configuration. Alternatively, the discrete length fibers within the second layer 18 may include a mixture of cross-sectional configurations.

The discrete length fibers are bonded to each other at points of contact, but the second layer 18 remains sufficiently open to provide beneficial transport properties. The second layer 18 is considered to be substantially fully bonded in that the discrete length fibers are bonded together at a plurality of crossover points. The bonding within the second layer 18 can be independently accomplished by any known means, such as by the melting of binder fibers, resin bonding, etc. In preferred embodiments, the second layer 18 is bonded using binder fibers and thus further includes binder fibers. The binder fiber may be included within the second layer 18 in any amount effective to induce an adequate level of bonding. The binder fiber is typically present in the second layer 18 in amounts ranging up to about 60 weight percent, such as in amounts ranging up to about 40 weight percent. In alternative aspects of the invention, the discrete length fibers within the second layer 18 are multiconstituent fibers that include a binder polymer as a component. For example, in such alternative embodiments the discrete length fibers may have a sheath/core configuration in which the sheath is formed from a binder polymer.

The binder fibers within the second layer 18 are generally formed from any polymer exhibiting a melting or softening temperature at least about 10° C. lower than the discrete length fibers. The binder fibers may all be formed from the same polymer or may include a mixture of higher and lower melting binder fibers. For example, the binder fibers may include a mixture of fibers, a first portion of which have a lower melting temperature, such as about 225° F., and a second portion of which have a higher melting temperature, such as about 375° F. Exemplary binder fibers may be formed from one or more low melting polyolefin polymers or copolymers, one or more low melting polyester polymers or copolymers or mixtures thereof. In preferred embodiments of the invention, the binder fiber is formed from a low melting polyester copolymer, particularly polyethylene isophthalate.

The binder fibers within the second layer 18 may have any cross-section known in the art. In preferred embodiments, the binder fibers within the second layer 18 have a circular cross-section. The binder fibers within the second layer 18 may further have any denier or mixture of deniers known in the art for binding nonwoven fabrics.

The materials and process conditions associated with the second layer 18 are selected so as to provide a smooth casting surface 22. The second layer 18 typically provides a porosity-permeability after calendering ranging from about 5 to 30 cfm Textest Air Permeability, depending on the substrate's performance need. The second layer 18 is typically characterized by a basis weight ranging from about 30 to 70 gsm, such as from about 40 to 60 gsm. Suitable wet-laid fabrics for use as the second layer 18 have been commercially available, such as MEMBACK® nonwovens, from BBA.

In the embodiment illustrated in FIG. 1, the composite support 14 includes a single wet-laid second layer 18. In alternative embodiments, the composite support 14 includes more than a single wet-laid layer. For example, the composite support 14 may include two contiguous wet-laid layers. For embodiments including at least two wet-laid layers, the fibers and materials comprising the respective wet-laid layers may be the same or may differ. For example, the wet-laid layers may differ in composition, average denier, basis weight or fiber cross-section.

The composite support 14 formed by the combination of the first layer 16 and the second layer 18 generally has a thickness ranging from approximately 2 to 8 mils, such as a thickness of about 3 to 4 mils. The composite support 14 is further typically characterized by a basis weight of less than about 80 gsm, such as a basis weight ranging from about 40 to 70 gsm. The composite support 14 generally provides a porosity-permeability ranging from about 5 to 30 cfm Textest Air Permeability.

As shown in FIG. 1, the filtration media 10 of the invention further includes a composite membrane 11, adhered to the casting surface 22 of the composite support 14. The composite membrane 11 includes a semipermeable membrane 12 and an intermediate porous polymer layer 13.

Any intermediate porous polymer layer 13 known in the art of precise filtration may be used in conjunction with the composite support 14. Polysulphone is one example of material which may be used to form the intermediate porous polymer layer 13. As known in the art, intermediate porous polymer layers typically have a cellular structure that resembles tiny tubes extending from one plane to the next. The intermediate porous polymer layer 13 generally improves the surface smoothness, allowing the use of thinner semipermeable membranes 12, thereby increasing throughput. The intermediate porous polymer layer 13 typically ranges in thickness from about 40 to 70 microns, such as from about 45 to 65 microns, particularly from about 45 to 50 microns.

Any semipermeable membranes known in the art of reverse osmosis, ultrafiltration, nanofiltration or micro-filtration may be used in conjunction with the composite support 14. Non-limiting exemplary semipermeable membranes include polymeric films formed from cellulose acetate ("CA"), cellulose triacetate, CA-cellulose triacetate blends, gelatin, polyamine, polyimide, poly(ether imides), aromatic polyamide, polybenzimidazole, polybenzimidazolone, polyacrylonitrile, PAN-poly(vinyl chloride) copolymer, polysulfone, polyethersulfone, poly(dimethylphenylene oxide), poly(vinylidene fluoride), polyelectrolyte complexes, polyolefins, poly(methyl methacrylate) and copolymers and mixtures of these materials.

Semipermeable membranes suitable for use with the present invention may have any thickness known in the art for such membranes, such as a thickness ranging from about 25 angstroms to 100 microns, preferably about 1 micron. In some embodiments, the semipermeable membranes are asymmetrical in nature.

In the embodiment illustrated in FIG. 1, the filtration media 10 includes a single semipermeable membrane 12 and a single intermediate porous polymer layer 13. In alternative embodiments of the invention, the filtration media may include multiple semipermeable membrane layers and/or multiple intermediate porous polymer layers. In such embodiments, each of the semipermeable membrane and/or porous polymer layers may be the same or may differ is some respect, such as differing compositions or configurations.

The composite membrane 11 impregnates at least the outermost surface of the composite support 14 to provide adequate adhesion to the resulting filtration media 10. However, although impregnating the outermost region of the composite support 14, the composite membrane 11 does not over-penetrate the composite support 14. For example, the composite membrane 11 does not penetrate through the entire thickness of the composite support 14, i.e., to the outer surface 17 of the first layer 16. The absence of such over-penetration is surprising in light of the more open fiber structure provided by the continuous filaments within the spunbond layer 16 in comparison to nonwoven webs formed of discontinuous filaments, such as staple fibers.

Applicants hypothesize that the continuous filaments within the spunbond first layer 16 result in a smoother casting surface 22 in comparison to conventional composite supports incorporating carded nonwovens. Although not wishing to the bound by theory, Applicants have found that the surface roughness of intermediate surfaces within the composite support, such as the surface of the spunbond layer contacting the wet-laid layer 18, ultimately affects the surface properties of the opposing surface of the wetlaid layer, i.e. the casting surface 22. The superior smoothness imparted by the continuous filaments within the first layer 16 is further surprising in light of the fact that carded staple fiber webs, i.e., webs formed of longer discrete length fibers, impart greater casting surface roughness to composite supports in comparison to membrane supports formed of a single layer of shorter discrete length fibers, i.e., wet-laid fibers. The smoother casting surfaces of the invention generally result in fewer holes and/or voids within the composite membrane 11.

The absence of holes and voids within the composite membrane 11 is generally reflected by higher efficiencies within the filtration media. Higher efficiencies are typically evidenced by a combination of elevated filtrate rejection characteristics and permeate throughputs.

Figure 2:
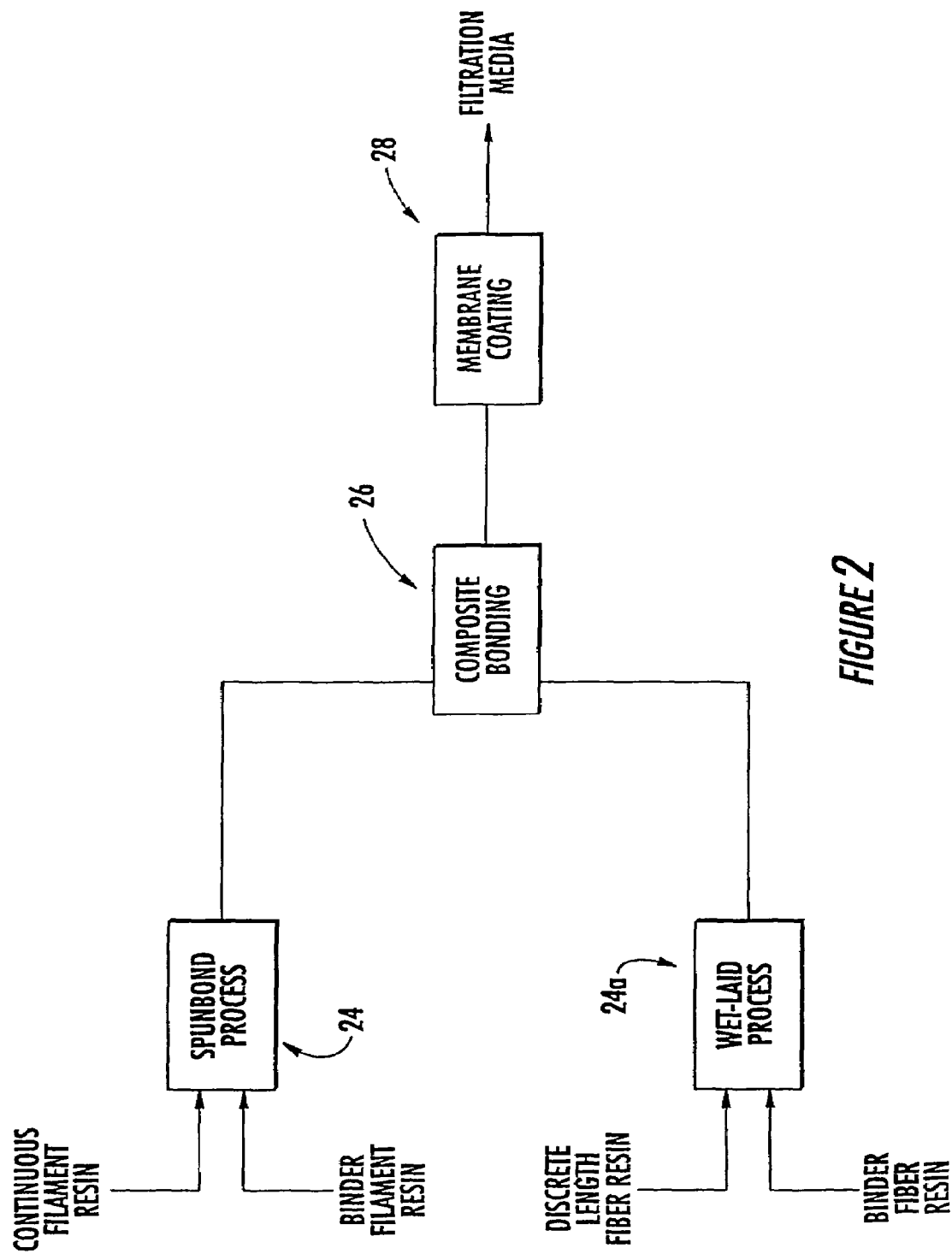
FIG. 2 is a schematic illustration of an exemplary process for forming filtration media in accordance with the present invention.

The filtration media 10 may be formed using manufacturing processes known in the industry. Referring now to FIG. 2, an illustrative process for forming advantageous embodiments of the filtration media 10 is provided. As shown, the composite support may be produced by (1) forming the first layer via a spunbond process and the second layer via a wet-laid process, 24 and 24a, respectively; (2) bonding the spunbond and wet-laid fabrics to form a composite support, 26; and (3) applying a composite membrane to the composite support, 28.

The first layer can be produced using any conventional spunbonding apparatus capable of forming a nonwoven fabric from substantially continuous thermoplastic polymer filaments and binder filaments. Spunbonding generally involves extruding and subsequently attenuating continuous filaments as they are being deposited onto a moving collection surface or screen. The filaments collect in the form of a web, which is then conveyed on the screen to a thermal fusion station, preferably a pair of cooperating calender rolls, to provide a spunbond fabric. The web is bonded together to provide a multiplicity of thermal bonds distributed throughout the spunbond fabric. The bonded spunbond fabric is then wound up by conventional means on a roll. Spunbonding processes and apparatus are well known to the skilled artisan.

As indicated in FIG. 2, the second layer is typically formed in a separate wet-laying process. Any wet-laid process known in the art may be used to form the second layer. Wet-laying processes generally involve depositing a layer of fibers suspended within an aqueous slurry, commonly referred to as a furnish, onto a continuous screen. In preferred embodiments, the fibers within the wet laid layer are randomly deposited to give the web isotropic properties that are nondirectional in nature. Water from the furnish is drawn through the screen, leaving behind an initial wet-laid web. A stack of drying rollers removes additional water from the initial wet-laid web and consolidates the web. The dried wet-laid web exits the drying rollers and is wound up by conventional means on a roll. Wet-laid processes and apparatus are known to the skilled artisan and are disclosed, for example in U.S. Pat. No. 5,851,355 to Goettmann.

Figure 3:
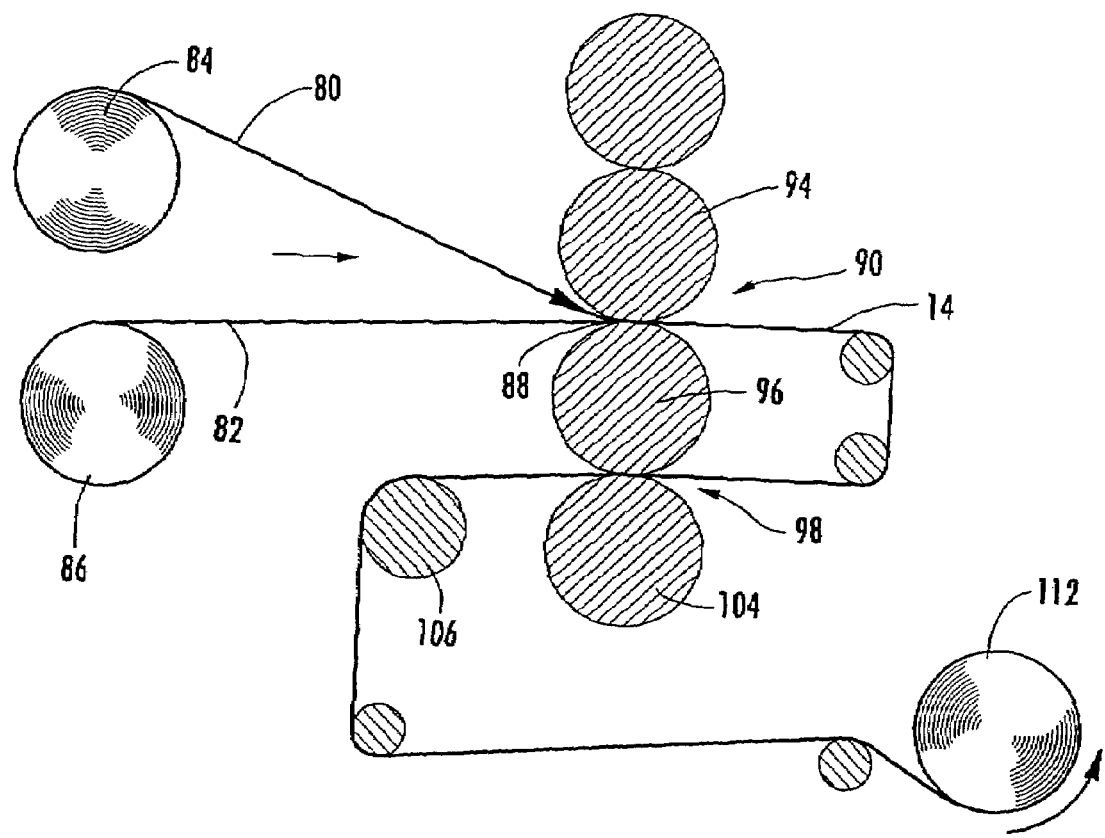
FIG. 3 is a schematic illustration of an apparatus for forming the membrane support of the present invention.

As shown in FIG. 2, the composite support 14 is subsequently produced by bonding the preformed spunbond and wet-laid layers. Advantageously, the layers are bonded together to provide a multiplicity of thermal bonds between the spunbond and wet-laid fabrics. A plurality of vertically stacked rolls may be used to bond the preformed spunbond and wet-laid layers, as illustrated in FIG. 3. As shown, the vertically stacked rolls define multiple nips, and the preformed layers pass through the multiple nips in a serpentine pattern. Each nip within the bonding apparatus of FIG. 3 may be independently heated and loaded. In alternative embodiments, a series of horizontal rolls may be used to form multiple bonding nips, each of which may similarly be independently heated and loaded.

As shown in FIG. 3, the spunbond 80 and wet-laid 82 webs are unwound from rolls 84 and 86, respectively. The rolls of spunbond web 84 and wet-laid web 86 are arranged so that, upon unwinding, the spunbond 80 and wet-laid 82 layers are superposed in an opposing face-to-face relationship.

The superposed layers 88 are subsequently conveyed longitudinally through a first nip 90. Within the first nip 90, the binder filaments in the spunbond fabric and the binder fibers in the wet-laid web begin to soften and fuse to adhere the layers together. The first nip 90 is constructed in a conventional manner as known to the skilled artisan. In the embodiment illustrated in FIG. 3, the first nip 90 is defined by a pair of cooperating calender rolls 94 and 96, which are preferably smooth and advantageously formed from steel. The cooperating calender rolls 94 and 96 preferably provide a fixed gap nip. The fixed gap nip ensures that the superposed layers 88 will not exit the first nip 90 thinner than the targeted gap thickness, regardless of any excess pressure that may be applied. In the advantageous embodiment illustrated in FIG. 3, pressure is applied to the first nip 90 using a topmost roll 97.

Bonding conditions, including the temperature and pressure of the first nip 90, are known in the art for differing polymers. For composite supports comprising polyethylene terephthalate nonwoven spunbond and wet-laid fabrics which both further include polyethylene isophthalate binder filaments and/or fibers, the first nip 90 is preferably heated to a temperature between about 120° C. and 230° C., preferably from about 200 to 225° C. The first nip 90 is typically run at pressures ranging from about 40 to 350 pounds per linear inch (pli), such as from about 80 to 200 pli.

In an alternative embodiment, shown by broken lines, the two superposed layers 88 can be partially wrapped around an additional roll, e.g. passing over the top roll 97 and then through the nip defined between rolls 97 and 94, which is heated to a temperature of about 200° C. prior to passing through the nip 90 between rolls 94, 96. Passing the superposed webs 88 over the additional heated roll 97 prior to the calender rolls 94, 96 preheats the superposed layers 88 before they enter the nip 90. Such preheating allows increased bonding speeds.

Returning now to FIG. 3, the superposed layers exiting the first nip 90 subsequently enters a second nip 98. The second nip 98 is formed by a top roll 96 and a bottom roll 104. The rolls 96 and 104 are preferably steel.

The pressure within the second nip 98 is typically higher than the pressure in the first nip 90, further compressing the superposed layers exiting the first nip 90. Consequently, the gap formed by the second nip 98 is narrower than the gap provided by the first nip 90. The pressure in the second nip 98 is typically about 120 to 1100 pli, such as from about 180 to 320 pli. The second nip 98 may further be heated, such as to a temperature ranging from about 120 to 230° C., preferably from about 200° C. to 225° C. The resultant bonded composite support 14 exiting the second nip 98 may be transported over a chill roll 106 and wound up by conventional means on a roll 112.

Although a bonding apparatus in the form of a series of calender rolls is illustrated in FIG. 3, other bonding apparatus such as ultrasonic, microwave or other RF treatment zones which are capable of bonding the superposed layers can be substituted for the calender rolls of FIG. 3. Such conventional thermal treatment stations are known to those skilled in the art and are capable of effecting substantial thermal fusion of the two nonwoven webs. It is also possible to achieve bonding through the use of an appropriate bonding agent as is known in the art, singly or in combination with thermal fusion.

Returning now to FIG. 2, the filtration media is then formed by casting or otherwise applying or coating the composite or semipermeable membrane onto the composite support. Methods by which to apply composite and semipermeable membranes to porous supports are known to the skilled artisan and are disclosed, for example in U.S. Pat. No. 4,277,344 to Cadotte; U.S. Pat. No. 5,522,991 to Tuccelli et al. and U.S. Pat. No. 6,132,804 to Rice et al. In general, the composite or semipermeable membrane may be applied to the composite support by means such as dip coating, extrusion coating, knife-over-roll coating, slot coating and the like. The thickness of the composite or semipermeable membrane may vary widely, depending upon the specific membrane composition and filtration application, as known in the art. Subsequent to coating application, the composite or semipermeable membrane is subjected to a solification process to bond the composite or semipermeable membrane to the composite support. Various solidification processes are known to the skilled artisan and may be employed in conjunction with the present invention. Exemplary solidification processes include hot air drying, interfacial polymerization, crosslinking and the like. The resulting filtration media exits the solidification process and is wound up by conventional means on a roll.

In embodiments of the invention directed to composite membranes or multiple semipermeable membrane layers, the various layers may be applied to the composite support using consecutive coating processes, such as consecutive slot coatings, as described in U.S. Pat. No. 6,132,804 to Rice et al. In such embodiments, further preservation steps may be required to assure maintenance of the pore structure provided by the interior membrane layers, as known in the art.

The particular membrane support employed will typically be determined either by the type of separation/filtration process in which it is used and/or the requirements of the semipermeable or composite membrane casting process. Regardless of substrate configuration, porosity is an important property for a properly functioning membrane support. Substrate thickness is another important factor to consider, because thickness affects the total membrane area that can be accommodated into a filtration module. Generally, thinner membrane supports allow greater membrane area within a filtration module, equating to a higher module output. The use of lighter weight membrane supports further yields significant cost savings to the user. In addition to suitable porosity and minimal thickness, composite supports of the invention advantageously provide uniformity in their thickness, have good adhesion to the composite or semipermeable membrane, have a minimal number of surface defects which could lead to pinholes and are strong enough to withstand the membrane casting process.

The composite supports of the invention may be advantageously used to form filtration media, particularly semipermeable membrane filtration media employed in reverse osmosis, ultrafiltration and nanofiltration applications. However, the nonwoven laminates of the invention may also be suitable for a number of non-filtration applications, as well. For example, the nonwoven laminates of the invention may be employed in any application in which a strong, smooth material is desired. Particularly advantageous non-filtration applications for the nonwoven laminates of the invention include banner and signage stock.

The following examples are provided for purposes of further illustrating specific embodiments of the invention. It should be understood, however, that the invention is not limited to the specific details given in the examples.

EXAMPLES

Examples 1 through 5 in accordance with the present invention were produced using the layer compositions provided in Tables 1 and 2 below. The samples below were produced from polyester spunbond and wetlaid fabrics that further included polyester binder fiber.

The individual wetlaid and spunbond fabric layers were prepared using processes well known in the art. The wetlaid and spunbond fabric layers were bonded into a composite support using the process described in conjunction with FIG. 3. The pressure between the thermal bonding rolls ranged from about 80 to 200 pli, while the temperature of the thermal bonding nip was about 225° C. The pressure between the surface compaction rolls ranged from about 180 to 320 psi, while the temperature of the surface compaction nip was about 223° C.

TABLE 1

Wetlaid Fabric Construction

| | Layer Identification | |
|---|---|---|
| | C | D |
| Basis Wt (gsm) | 37.0 | 55.0 |
| Fiber 1[1] | | |
| Denier | 0.4 | 0.4 |
| Length (mm) | 10.0 | 10.0 |
| Weight Percent (%) | 20.0 | 35.0 |
| Fiber 2[2] | | |
| Denier | 1.5 | 1.5 |
| Length (mm) | 12.5 | 12.5 |
| Weight Percent (%) | 38.0 | 25.0 |
| Fiber 3[1] | | |
| Denier | 1.0 | 1.0 |
| Length (mm) | 5.0 | 5.0 |
| Weight Percent (%) | 37.0 | 35.0 |
| Fiber 4[1] | | |
| Denier | 2.0 | 2.0 |
| Length (mm) | 5.0 | 5.0 |
| Weight Percent (%) | 5.0 | 5.0 |

[1]Commercially available from Kuraray Co., Ltd. of Osaka Japan.
[2]Commercially available from Kosa of Charlotte, North Carolina.

TABLE 2

Spunbond Fabric Construction

| | Layer Identification | | |
|---|---|---|---|
| | E[3] | F[3] | G[3] |
| Basis Weight (gsm) | 13.6 | 18.0 | 34.0 |
| Denier | 4 | 2.2 | 2.2 |

[3]Commercially available from Reemay, Inc. of Old Hickory, Tennessee.

Table 3 provides the layer configuration and properties exhibited by Examples 1 through 5 and Comparative Examples 1 and 2. The basis weight, thickness, air permeability, bubble point and mean flow pore size were all determined using methods well known in the art.

TABLE 3

Sample Performance

| | Comp. Ex. 1 | Comp. Ex. 2 | Ex. 1 | Ex. 2 | Ex. 3 | Ex. 4 | Ex. 5 |
|---|---|---|---|---|---|---|---|
| Wetlaid layer | A[1] | B[1] | C | C | D | D | D |
| Spunbond layer | None | None | E | F | E | G | F |
| Sample Basis Weight (gsm) | 84 | 77 | 51.8 | 55.9 | 71.3 | 74.1 | 77.5 |
| Thickness (mils) | 4 | 3.9 | 3.3 | 2.7 | 3.6 | 3.2 | 3.5 |
| Air Permeability (cfm) | 9 | 10.5 | 29.4 | 19.8 | 7.1 | 12.9 | 6.9 |
| Bubble Point (um) | 23.5 | 45.3 | 46.8 | 35.4 | 28.8 | 33.0 | 25.5 |
| Mean Flow Pore Size (um) | 11 | 16.3 | 23.2 | 25.6 | 14.1 | 20.0 | 11.3 |

[1]A and B are commercially available wetlaid substrates.

As indicated in Table 3, membrane supports formed in accordance with the invention are generally thinner and lighter than membrane supports formed from wetlaid nonwoven alone. The membrane supports of the invention further provide acceptable porosity, as indicated by the air permeability, bubble point and mean flow pore sizes shown in Table 3.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of producing a composite support for a semipermeable membrane, comprising
    forming a spunbond nonwoven fabric first layer formed of continuous thermoplastic polymer matrix filaments and binder filaments of a lower-melting thermoplastic polymer composition;
    forming a wet-laid nonwoven fabric second layer of discrete length thermoplastic polymer fibers, including matrix fibers and binder fibers of a lower-melting thermoplastic polymer composition; and
    bonding said first and second layers in opposing face-to-face relationship to form a composite support, whereby the first and second layers define first and second outer surfaces of the composite support.

2. A method of producing a composite support according to claim 1, wherein said bonding further comprises transporting the composite support through a nip between a pair of cooperating calender rolls.

3. A method of producing a composite support according to claim 1, wherein the calender rolls are at a temperature between about 120° C. and 230° C. and the nip exerts pressures ranging from about 80 to 200 pli.

4. A method of producing a composite support according to claim 2, wherein said bonding further comprises transporting the composite support through a second nip between a second pair of cooperating calender rolls.

5. A method of producing a composite support according to claim 4, where the second nip is at a temperature between about 180° C. to 320° C. and the second nip exerts pressures ranging from about 150 to 260 psi.

6. A method of providing a composite support according to claim 4, wherein said second nip exerts a higher pressure than said first nip.

7. A method of providing a composite support according to claim 4, wherein the gap within the second nip is narrower than the gap within the first nip.

8. A method of producing a composite support for a semipermeable membrane, comprising
    forming a nonwoven fabric first layer by extruding a multiplicity of continuous thermoplastic polymer matrix filaments and binder filaments of a lower-melting thermoplastic polymer com position, randomly depositing the matrix and binder filaments on a collection surface, and bonding the matrix and binder filaments together to form a spunbond nonwoven web;
    forming a nonwoven fabric second layer by wet-laying discrete length thermoplastic polymer fibers, including matrix fibers and binder fibers of a lower-melting thermoplastic polymer composition, to form a web and bonding the matrix and binder fibers together to form a wet-laid nonwoven web;
    arranging the first and second layers in an opposing face-to-face relationship and directing the layers through a series of heated nips to bond the first and second layers to one another.

9. A method of producing filtration media, comprising
    forming a spunbond nonwoven fabric first layer of continuous thermoplastic polymer matrix filaments and binder filaments of a lower-melting thermoplastic polymer composition;
    forming a wet-laid nonwoven fabric second layer of discrete length thermoplastic polymer fibers, including matrix fibers and binder fibers of a lower-melting thermo plastic polymer composition;
    bonding said first and second layers in opposing face-to-face relationship to form a composite support, whereby the first and second layers define respective first and second outer surfaces of the composite support; and
    applying a semipermeable membrane or porous polymer layer to the second outer surface of the composite support.

10. A method of producing filtration media according to claim 9, wherein said applying step comprises at least one process selected from the group consisting of dip coating, extrusion coating, knife-over-roll coating and slot coating.

* * * * *